United States Patent [19]
Hildebrand et al.

[11] Patent Number: 5,457,270
[45] Date of Patent: Oct. 10, 1995

[54] CHEMICAL CONTROL SYSTEM FOR CONFINING VOLATILE LIQUIDS

[76] Inventors: Philip B. Hildebrand, 541 Ventris Ct., Maitland, Fla. 32751; Joseph P. Parent, 1570 Chestnut Ave., Winter Park, Fla. 32789

[21] Appl. No.: 130,865

[22] Filed: Oct. 4, 1993

[51] Int. Cl.$^6$ .................................................. B09B 5/00
[52] U.S. Cl. ...................... 588/249; 134/104.2; 405/128; 588/259
[58] Field of Search ..................................... 405/128, 129, 405/258; 588/249, 259; 134/104.2

[56] References Cited

U.S. PATENT DOCUMENTS

| | | | |
|---|---|---|---|
| 3,380,369 | 4/1968 | Allander | 98/36 |
| 3,726,203 | 4/1973 | Lindestrom | 98/36 |
| 3,776,121 | 12/1973 | Truhan | 98/33 |
| 3,897,229 | 7/1975 | Lada | 55/467 |
| 4,133,255 | 1/1979 | Guice | 98/115 |
| 4,267,769 | 5/1981 | Davis et al. | 98/33 |
| 4,427,427 | 1/1984 | DeVecchi | 55/358 |
| 4,576,613 | 3/1986 | Miline | 55/1 |
| 5,067,852 | 11/1991 | Plunkett | 405/128 |
| 5,246,309 | 9/1993 | Hobby | 405/128 |
| 5,254,798 | 10/1993 | Zoback | 588/259 |

*Primary Examiner*—David H. Corbin
*Attorney, Agent, or Firm*—William M. Hobby, III

[57] ABSTRACT

A chemical control system for controlling volatile hydrocarbons adjacent a dry cleaning machine is providing having a first framework of air distribution pipes positioned adjacent the upper portion of a dry cleaning machine for discharging low pressure air in a predetermined pattern therefrom. A second framework of fluid intake pipes are positioned adjacent to the lower portion of a dry cleaning machine for drawing in air and volatile liquid fumes and filtering the air being drawn thereinto. Sensors are provided for sensing fluids, air pressure, and temperature for controlling the operation of the system. A liquid catch basin is provided under and around the dry cleaning machine for capturing liquids for removal from the liquid catch basin. The system also provides a plurality of fluid discharge pipes placed in the earth below the dry cleaning machine along with pipes for drawing in fluid so that the earth below the dry cleaning machine is cleansed of volatile fluids. A method is provided for confining and filtering volatile liquids escaping as a vapor or liquid from a dry cleaning machine.

20 Claims, 4 Drawing Sheets

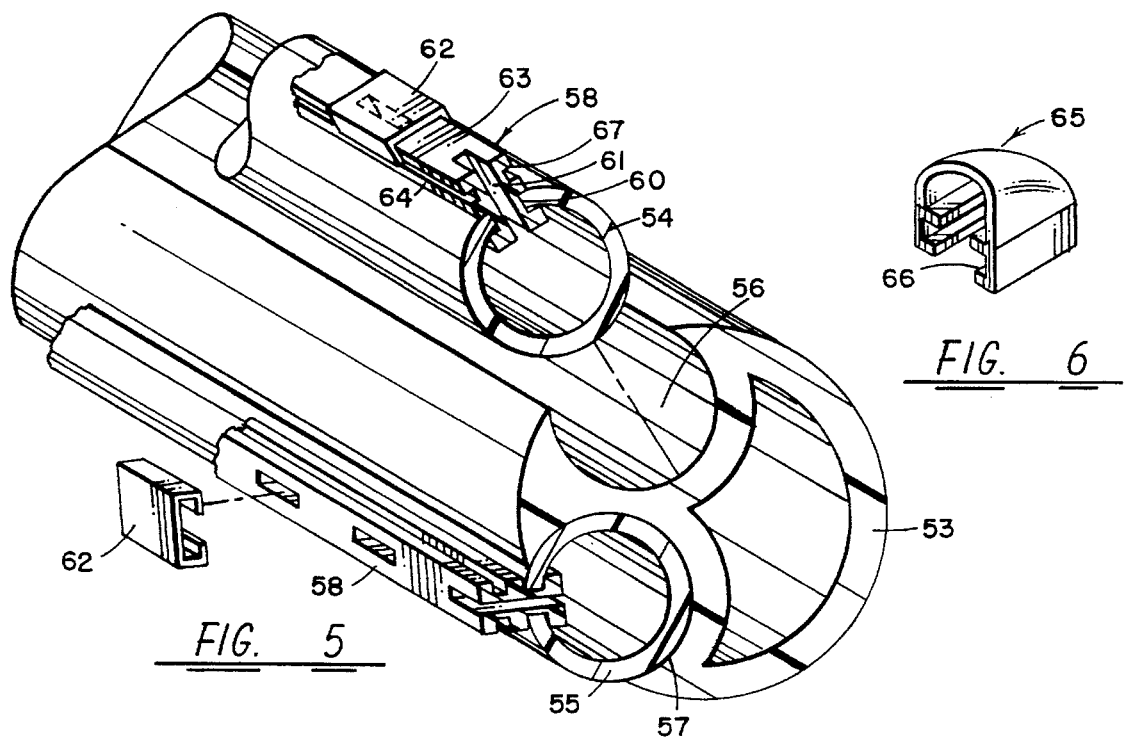
FIG. 5
FIG. 6
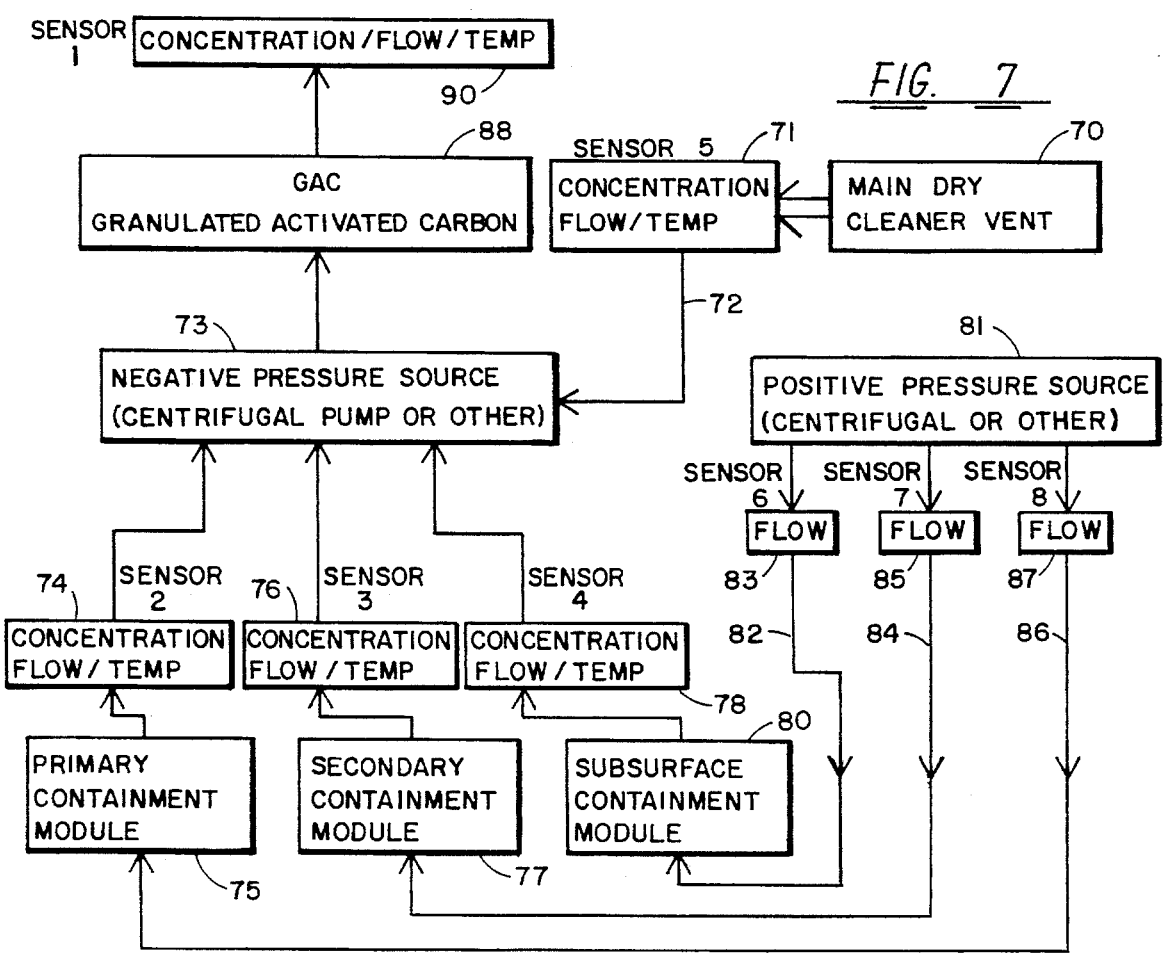
FIG. 7

CHEMICAL CONTROL SYSTEM FOR CONFINING VOLATILE LIQUIDS

BACKGROUND OF THE INVENTION

The present invention relates to a chemical control system for confining volatile fluids and especially to a chemical control system for confining dry cleaning fluids from a dry cleaning machine in a dry cleaning facility.

Dry cleaning plants are commonly provided throughout the country for cleaning of clothes and fabric materials. Dry cleaning plants are typically small operations and there are approximately 30,000 dry cleaning establishments in the United States, most of which are small businesses using large volumes of hazardous material. This makes the industry one of the largest groups of chemical users in general contact with the public. In addition, employees of dry cleaning establishments typically have little training in the use of hazardous materials. Most of the dry cleaning establishments in the U.S. use a volatile liquid, perchlorethylene (Perc.), which is heated and used in a dry cleaning machine within the establishment to clean the clothes or fabric without the use of water. A typical retail dry cleaning establishment has a dry cleaning machine, usually a dry dry machine, which uses approximately 100–150 gallons perchlorethylene along with associated equipment which might include a distiller unit, a solvent filter unit, associated piping condenser unit, a vent system from the dry cleaning unit to the outside, and a waste perchlorethylene storage area. Regardless of the care exercised by the operator, the perchlorethylene is routinely released in small amounts from the dry cleaning machine and associated units under normal operation. Perchlorethylene is released as a liquid from pipe failure and from the operation of the dry cleaning machine in which the volatile liquid is released in fumes upon the opening of the door to the machine for the insertion or removal of fabrics and clothing. Vapor is also released during the changing of the filters and in other activities in the dry cleaning establishment. Perchlorethylene vapors are released to the atmosphere both as fugitive emissions from spills and normal operations and through the ventilation system which is normally built into each dry cleaning machine. In addition, liquid perchlorethylene, when released, can penetrate through concrete floor slabs resulting in contamination of the soil and groundwater. Such contamination results in significant financial hardships for dry cleaners, land owners, and financial institutions holding mortgages since it may result in making it difficult to sell the property and the costs of cleanup can be costly. Perchlorethylene released as vapor within the dry cleaning facility results in health and safety risks for workers as well as a general risk to the public through fugitive and vented atmospheric release of vapor.

The present invention is directed towards a system for preventing or reducing the escape of liquid perchlorethylene or other dry cleaning chemicals through vapors in the operation of machinery as well as through liquid spills or the like and which can be rapidly retrofitted to existing dry cleaning equipment to contain both liquid and gaseous emissions and also is sufficiently modular that different portions can be used and expanded to add other portions and uses a low pressure air current with a discharge in predetermined areas and a collection of the air from the air curtain along with vapors into a system for filtering out the perchlorethylene vapor. The system provides an electronic monitoring system for monitoring and controlling the system in addition to an in situ system for monitoring, confining, and cleaning the subsurface areas below dry cleaning equipment.

In the past, there have been a wide variety of systems which used a controlled flow of air for preventing contamination within a predefined area and these include the following U.S. Patents. The Guice U.S. Pat. No. 4,133,255, teaches a paint spray booth and method of painting an article therein in which air under pressure is discharged above a painting booth to surround a car being painted to remove paint laden air from the booth into plenums positioned at the ground level of the booth. The Davis et al. U.S. Pat. No. 4,267,769, teaches a prefabricated knock-down clean room which moves air under pressure through a filter media to remove micro-organisms from the air. The Lindestrom U.S. Pat. No. 3,726,203, teaches a device for maintenance of a dustfree, bacteria-free zone in a room which creates a separate zone with an unbroken air curtain around the zone. The Truhan U.S. Pat. No. 3,776,121, is for a controlled environmental apparatus for industry which uses a plurality of controlled outlets for directing treated air downward at a rate progressively increasing in volume from the center of the control zone outwardly and has a plurality of inlet plenums spaced at the floor level at control points for redrawing in air to be filtered. The DeVecchi U.S. Pat. No. 4,427,427, is for a vertical laminar flow filter module which provides a work area of ultra high efficiency air filtration in which the perimeter of the work area has a curtain of air enclosing the area. The Allander U.S. Pat. No. 3,380,369, is a system for ventilating clean rooms in a hospital around an operating table. The ventilated air forms a bounded space using a perforated ceiling in the space to supply the air through a slot line and then exhausting the air through outlets near the floor of the room. The Lada U.S. Pat. No. 3,897,229, is a dual action laminar air flow system in which air inlets are located in the upper portion with exhaust openings located in a lower portion of the system. The Miline U.S. Pat. No. 4,576,613, is a process for combining the pollution in an area with the aid of a gaseous jet for the confinement of areas containing toxic or radioactive materials and uses gas jets on opposite sides of an area to confine the radioactive materials.

In contrast, the present chemical control system is used for confining volatile fluids around a dry cleaning machine and can be installed as a framework around the dry cleaning equipment to provide a low pressure air discharge from the top portion and fluid intake pipes at the lower portion of the dry cleaning equipment to form a predefined air flow which can be readily modified as to shape and size of the confinement area and which provides not only filtering of the fluids but electronic sensors for controlling the system and a catch basin below the equipment for the handling of spilled liquids, as well as an underground system for confining and cleaning the soil beneath the floor of the building.

SUMMARY OF THE INVENTION

A chemical controlled system for controlling volatile hydrocarbons adjacent a dry cleaning machine is provided having a first framework of air distribution pipes positioned adjacent the upper portion of a dry cleaning machine for discharging low pressure air in a predetermined pattern therefrom. A second framework of fluid intake pipes is positioned adjacent to the lower portion of a dry cleaning machine for drawing in air and volatile liquid fumes and filtering the air being drawn thereinto. Sensors are provided for sensing fluids, air pressure, and temperature for controlling the operation of the system. A liquid catch basin is provided under and around the dry cleaning machine for capturing liquids for removal from the liquid catch basin. The system also provides a plurality of fluid discharge pipes placed in the earth below the dry cleaning machine along with pipes for drawing in fluid so that the earth below the dry cleaning machine has volatile fluids confined and removed therefrom. A method is provided for confining and filtering volatile liquids escaping as a vapor or liquid from a dry cleaning machine.

BRIEF DESCRIPTION OF THE DRAWINGS

Other objects, features, and advantages of the present invention will be apparent from the written description and the drawings in which:

FIG. 5 is a partial perspective view of the fluid intake pipes of FIG. 4;

FIG. 6 is a perspective view of a cap for the fluid intake pipes of FIG. 5; and

FIG. 7 is a block diagram of the system monitoring electronics.

DETAILED DESCRIPTION OF THE PREFERRED EMBODIMENTS

Figure 1:
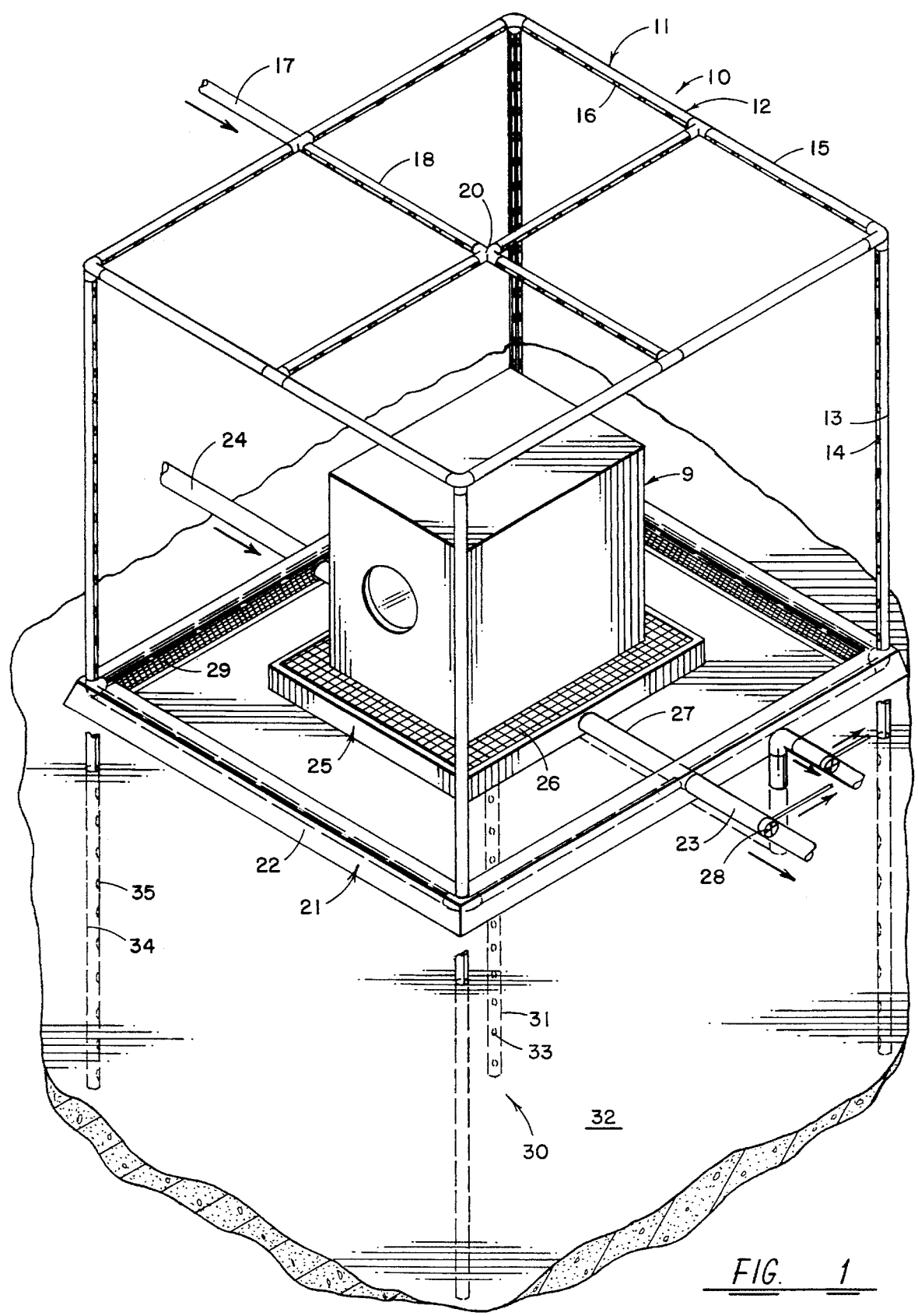
FIG. 1 is a perspective view of a chemical control system in accordance with the present invention.
Figure 2:
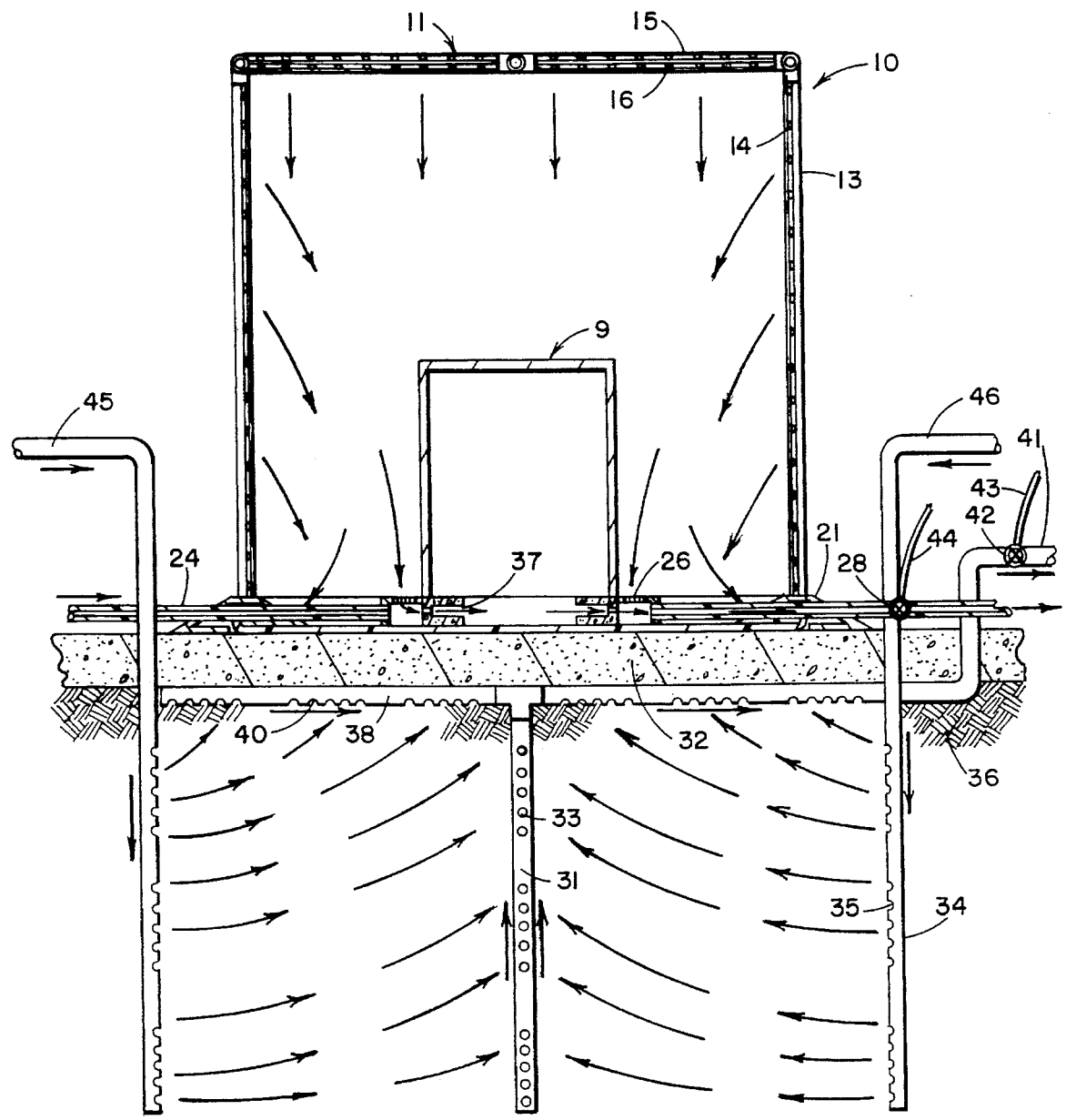
FIG. 2 is a sectional view taken through-the control system of FIG. 1 having arrows to show the overall operation of the fluid flow.

Referring to the drawings and especially to FIGS. 1 and 2, a chemical control system 10 for controlling volatile liquids is shown having a dry cleaning or dry dry machine 9 positioned in the middle thereof. The vapor containing portion of the containment system 11 includes an upper framework of air discharge pipes 12 including a plurality of vertical pipes 13 having a plurality of discharge openings 14 therein supporting a plurality of air discharge pipes 15, each having a plurality of openings 16 therein. An air inlet pipe 17 provides air under a low pressure into the framework 11 for discharging air through the pipes 15 and 13 and out the discharge openings 14 and 16. In FIG. 1, the discharge framework has four vertical posts 13 and a perimeter discharge pipe 15 along with four intersecting discharge pipes 18 connected between the pipes 15 into each other with a coupling 20. The entire containment framework 11 for discharging low pressure air can be made of standard piping, such as PVC or lightweight metal pipes (thin wall conduit), and connected with standard pipe fittings. The vertical discharge pipes 13 support the horizontal pipes 15 and 18 in a predetermined position over the dry cleaning machine 9 and are in turn supported within a fluid intake system 21 which draws in the air from the air discharge system 11 along with hydrocarbon vapors that may be picked up in the air by the air curtain created from the discharge air being drawn into the air handling system 21 placed along the floor in a perimeter around the dry cleaning machine 9. The fluid inlet system 21 includes a perimeter housing 22 having inlet pipes mounted thereinside and grate covered elongated side openings 29 extending around and facing the dry cleaning machine 9. A negative pressure is generated within the pipes within the housing 22 by air being drawn from an air and vapor discharge line 23 connected to the air inlet system which is also connected to draw air into the inlet pipe 24.

A liquid catch basin 25 includes an impervious lining surrounding a catch pan which has the dry cleaning machine 9 mounted in the middle thereof and surround by a grate 26 so that liquids do not escape from the machine 9 and are captured within the catch basin 25 and withdrawn from the catch basin as vapor by the pipe 27 drawing air and vapor therefrom into the fluid discharge pipe 23. Air under pressure is received in the catch basin from the line 24 directly into one side thereof. Air is also pulled through the grate 26 and out the discharge line 27. The discharge air can be controlled through the discharge pipe 23 by an electrically controlled valve 28 positioned therein.

A ground containment system 30 is also illustrated having a vertically extending pipes 31 extending through the floor slab 32 and into the surrounding earth below the floor slab 32. The vertical pipes have a plurality of openings or nozzles 33 therein for releasing a fluid under pressure. Four vertically extending pipes 34 extend from below the vertically extending pipes 13 into the ground for discharging air through the openings 35 whereas the pipe 31 had inlet openings 33 adapted to receive and remove the fluids discharged by the pipes 34 and into the horizontal pipe 38. The flow of the air or other fluid from the pipe 34 through the surrounding earth 36 to the intake pipe 31 and into a horizontally extending intake pipe removes the injected fluid and also captures volatile liquids that may have reached the soil 36. The liquid is confined and removed through the discharge system 41 which is then fed to a filter system to remove the volatile liquids from the air.

The overall containment system can be seen to include: the volatile air containment through the air discharge system 11 having the air and volatile vapor receiving system 21 to contain the vapors in the area of the dry cleaning machine 9 and the catch basin 25 placed around and below the dry cleaning machine 9 for catching liquids that spill therefrom along with drawing in air around the dry cleaning machine and the ground cleansing system 30 for confining, removing, and cleansing the earth by slowly moving fluids through the earth and to the fluid discharge system fluid collector pipes. The entire operation is controlled electronically by sensors which sense both the concentration of vapors and the flow pressure and the temperature of the fluids for determining when a system is to be turned on and off and for varying the flow of fluids and to determine the filter replacement. In addition, the control system, as illustrated in FIG. 7, may allow for an alarm upon the sensing of predetermined conditions. The sensors are connected to a CPU programmed to control the system by turning the electronic valves on and off responsive to sensor input and to issue alarms and warnings on filter changes and the like.

The flow of air in the system is better seen in connection with FIG. 2 in which air flow is indicated by arrows showing the flow of the fluids from the pipes 13 through the nozzles 14 and from the horizontal pipes 15 through the nozzles 16 directing low pressure air in a generally downward direction from above and beside the dry cleaning machine 9. The air moves in a curtain downward to the perimeter housing 21 as well as into and through the grates 26 of the catch basin 25 and into the pipe 27 to confine and remove volatile fluids escaping from the machine 9. The fluid is discharged through the pipe 27 and through the pipe 23 to form a low pressure air curtain around the dry cleaning machine 9 to capture volatile vapors from the air and to withdraw them through the discharge pipe 23 where they are fed to a filter system, such as a charcoal filter, which remove vapors from the vapor laden air. The air can be seen passing under the space 37 beneath the dry cleaning machine 9 where any liquid which have been caught in the catch basin 25 are vaporized and drawn out with the discharge air through the pipe 23. Catch basin 25 is lined with a vapor barrier which blocks the volatile liquids from reaching the concrete slab 32 since the perchlorethylene used in dry cleaning processes will pass through the concrete and into the soil 36. The subterranean containment system includes the pipes 34 having the air discharge nozzles 35 feeding into the soil 36 along with receiving pipes 31 having the nozzles 33 for receiving fluids, such as air and vaporized hydrocarbons, thereinto. In addition, the horizontal pipe 38 has a plurality of openings 40 therein for capturing fluids passing thereinto, as shown by the arrows in FIG. 2, which vapors are withdrawn through the discharge pipe 41 controlled by an electric valve 42 connected with the conductors 43. The valve 28 is further controlled by conductors 44 to control the discharge from the pipe 23. Fluid pressure lines 45 and 46 are used to drive fluids, such as air under pressure, into the subterranean discharge lines 34.

It will, of course, be clear that the various components of the chemical control system 10 including the vapor containment framework 11 for capturing vapors within the area and removing the vapors, a catch basin 25 for catching liquids, as well as vapors being drawn thereinto and the subterranean earth containment system 30 can all be put in separately as desired and in stages to provide various degrees of control for the volatile hydrocarbons used in the dry cleaning system including the dry cleaning machine 9.

Figure 3:
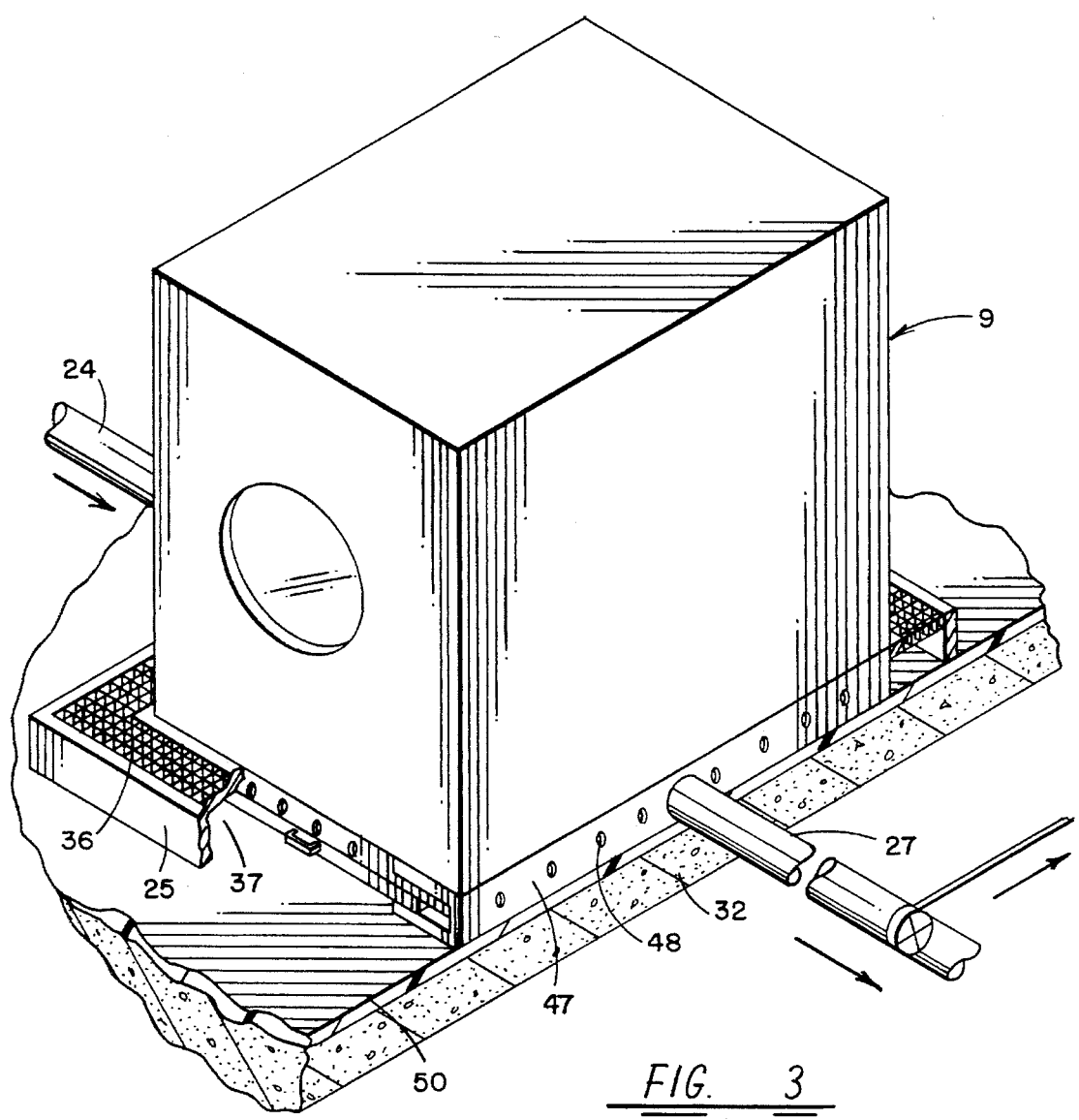
FIG. 3 is a perspective view of portions cut away of the dry cleaning machine showing the liquid catch basin for capturing and removing volatile liquids from the dry cleaning machine.

In FIG. 3, the dry cleaning machine 9 more clearly illustrates the catch basin 25 having a grate 36 thereover and having the dry cleaning machine 9 supported on a framework 47 having openings 48 for the passage of air in the capturing of vapors. A perchlorethylene impervious surface 50 is placed over the concrete slab 32 and the air inlet pipe 24 is fed into the catch basin, as seen in FIG. 2, and air is withdrawn through the exhaust pipe 27 from the catch basin and from beneath the dry cleaning machine 9.

Figure 4:
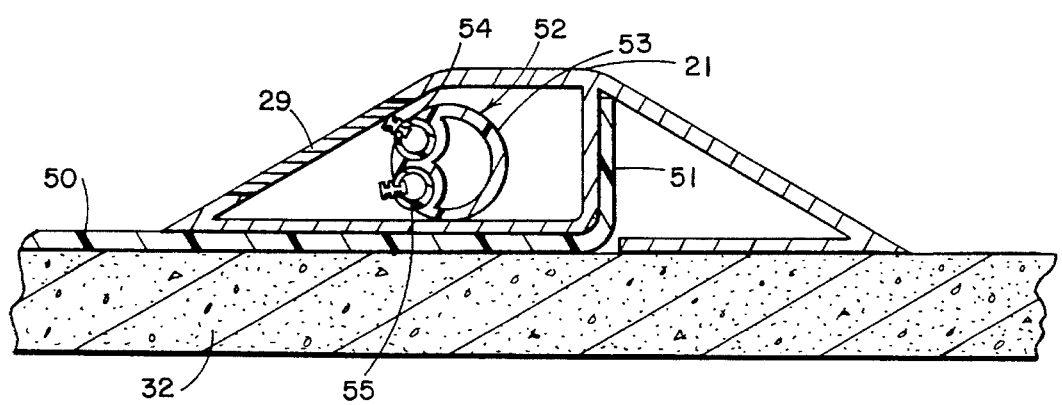
FIG. 4 is a sectional view taken through the fluid intake system for capturing and removing air with volatile liquid vapors from the air adjacent a dry cleaning machine.

FIGS. 4, 5 and 6 more clearly illustrate the operation of the fluid return which includes the housing 21 mounted on the concrete slab 32 in a perimeter around the dry cleaning machine 9 positioned to support the vertical upright pipes 13. The housing 21 has the impervious floor material 50 attached thereto and a vertically extending portion 51 to prevent the escape of spilled liquids. The housing 21 also has elongated grate openings 29 on the angled side facing the dry cleaning machine 9 within the housing 21 and the fluid return pipes 52, which can be seen as having the main pipe 53 having a pair of smaller pipes 54 and 55 mounted therein within a snap-in portion 56 and 57 formed into the pipe 53. The smaller pipes 54 and 55 each have a plural nozzle surface 58 attached thereto and extending through an opening 60 with flanges 61 for holding the nozzle portion 58 therein and has a plurality of slots 61 within the nozzle portion for receiving a gaseous fluid for passing therethrough into the pipe 54 or into the pipe 55. The pipes may be rotated within the holding portions 56 and 58 to adjust the angles of the intake 54 and 55 relative to each other. The intake portion 58 has a sliding clasp door 62 for each opening 61. Each door 62 can be slid over an opening 61 to close an intake opening or to open it by merely sliding the door 61 on the top track portion 63 of the nozzle portion 58 where the clasp portion connects to a pair of grooves 64 within the elongated nozzle portion 58. An end cap 65, as shown in FIG. 6, has grooves 66 which slide onto a track portion 67 to provide an end seal to the intake nozzle portion 58 of the inlet pipes. This piping system allows a greater degree of control by allowing the opening or closing of any particular pipes and through the control of the negative pressure within the pipes to control the air curtain formed by the vapor containment system for exhausting the air and volatile vapors from around a dry cleaning machine 11 to a filter for removing the volatile hydrocarbons.

Turning to FIG. 7, a block diagram of an electrical control system used in accordance with the present invention is illustrated in which the main dry cleaner vent 70 is connected to sensor 71 which senses the concentration of vapors as well as the flow pressure and temperature of the vapor and produces a signal in a conductor 72 connected to the negative pressure source for controlling the negative pressure in the fluid return air system. The negative pressure source 73 may be a centrifugal pump or the like and has a plurality of sensors connected thereto including a sensor 74 for measuring the concentration of vapors as well as the flow and temperature of the fluid received from the primary containment module 75 or the vapor containment portion 11 of FIGS. 1 and 2. Another sensor 76 measures the secondary containment module or fluid received from the catch basin 77 while a fourth sensor 78 measures the concentration of vapors plus the flow and temperature of the fluid received from the subsurface module 80 measuring the fluid return from the below ground system 30. A positive pressure source 81, which may be a centrifugal pump, or the like, produces the desired amount of air pressure from a first flow line 82 through a flow sensor 83 and through a second flow line 84 through a flow sensor 85 and in a third flow line 86 through a flow sensor 87. Flow line 86 connects to the primary vapor containment module 75 while the flow line 84 connects to the secondary module 77 and the flow line 82 connects to the subsurface containment module 82. All of the fluids received from each of the vapor entrapment system, the catch basin and subsurface modules are all fed to a granulated activated carbon filtration system 88 for removing the hydrocarbon or volatile vapors within the air and the clean air is then fed through the sensor 90 which measures the concentration of vapors as well as the fluid flow and temperature, which air may be fed back to the positive pressure source 81, as desired.

It should be clear at this time that a chemical control system for confining volatile liquids has been provided which contains and removes the volatile vapors, such as perchlorethylene, that may escape during the process of operating dry cleaning machinery has been provided which protects against both volatile in the air and spilled liquids and provides a continuous cleaning of the subsoil to prevent extensive damage to the environment and to protect workers working with the machinery. It should, however, be clear that the present invention is not to be limited to the forms shown which are to be considered illustrative rather than restrictive.

I claim:

1. A chemical control system for confining volatile liquids adjacent a dry cleaning machine comprising:

a first framework of pipes positioned and supported adjacent the upper portion of a dry cleaning machine and having an air inlet pipe connected thereto for feeding air under pressure thereinto, said framework of pipes having a plurality of openings therein positioned to release a curtain of air therefrom around said dry cleaning machine;

a second framework of pipes positioned adjacent the lower portion of a dry cleaning machine and having an fluid outlet connected thereto and said second framework of pipes having a plurality of openings therein for receiving air thereinto and volatile fluids into said second framework of pipes;

a filter system connected to said second framework of pipes fluid outlet pipe for filtering volatile fluids from said fluids being drawn thereinto;

sensor means for sensing volatile fluids in the air adjacent said dry cleaning machine for controlling the flow of air in said first and second framework of pipes whereby volatile dry cleaning fluids from a dry cleaning machine are reduced; and a dry cleaning machine catch area positioned below said dry cleaning machine for catching dry cleaning fluids escaping from said dry cleaning machine, said catch area having an outlet connected thereto for drawing air and fumes therefrom.

2. A chemical control system for confining volatile liquids adjacent a dry cleaning machine in accordance with claim 1 in which said second framework of pipes adjacent the lower portion of the dry cleaning machine includes a covering housing positioned on a building floor around said dry cleaning machine and having said pipes located thereinside.

3. A chemical control system for confining volatile liquids adjacent a dry cleaning machine in accordance with claim 2 in which said second framework housing has a grate covered elongated opening along one side thereof facing said dry cleaning machine.

4. A chemical control system for confining volatile liquids adjacent a dry cleaning machine in accordance with claim 1 in which said dry cleaning machine catch area has a portion thereof having a grate cover.

5. A chemical control system for confining volatile liquids adjacent a dry cleaning machine in accordance with claim 4 in which said catch area is a sunken area extending under said dry cleaning machine with the grate covered area extending around the perimeter of the dry cleaning machine.

6. A chemical control system for confining volatile liquids adjacent a dry cleaning machine in accordance with claim 1 including a plurality of pipes extending into the earth beneath the area around the dry cleaning machine, each sunken pipe having a plurality of openings therein and being connected to a source of fluid under pressure for forcing fluids into the surrounding earth.

7. A chemical control system for confining volatile liquids adjacent a dry cleaning machine in accordance with claim 6 including a plurality of fluid collecting pipes having a plurality of openings therein placed in the earth beneath the area around a dry cleaning machine for collecting fluid from said plurality of fluid discharge pipes positioned in the earth to thereby extract volatile fluids escaping into the earth below a dry cleaning machine.

8. A chemical control system for confining volatile liquids adjacent a dry cleaning machine in accordance with claim 2 in which said second framework of pipes includes each pipe having plurality of angled openings therein having adjustable angles.

9. A chemical control system for confining volatile liquids adjacent a dry cleaning machine in accordance with claim 8 in which said second framework of pipes includes pairs of spaced apart pipes each having a plurality of openings therein and each of said pair of pipes having the openings therein positioned at a different angle relative to each other.

10. A chemical control system for confining volatile liquids adjacent a dry cleaning machine in accordance with claim 9 in which each said opening in each said pipe in said second framework of pipes includes a door for selectively opening each said opening.

11. A chemical control system for confining volatile liquids adjacent a dry cleaning machine in accordance with claim 10 in which each of said pair of pipes in said second framework of pipes is rotatably attached to a single pipe whereby each pipe can be rotated to adjust the angle of the opening thereinto.

12. A chemical control system for confining volatile liquids adjacent a dry cleaning machine in accordance with claim 1 including a sensor connected thereto for measuring flow of fluids in said second framework of pipes.

13. A chemical control system for confining volatile liquids adjacent a dry cleaning machine in accordance with claim 12 including a sensor for measuring temperature of fluids in said second framework of pipes.

14. A chemical control system for confining volatile liquids adjacent a dry cleaning machine in accordance with claim 12 including a sensor for measuring hydrocarbon vapors in said second framework of pipes.

15. A process for confining volatile liquids adjacent a dry cleaning machine comprising the steps of:

feeding forced air in a predetermined pattern over a dry cleaning machine;

collecting air and volatile fluids from around said dry cleaning machine bottom portion;

filtering the air and volatile fluids collected to remove volatile fluids from the air;

collecting volatile liquids in a collection area beneath said dry cleaning machine; and removing said collected volatile liquids from the collection area below said dry cleaning machine through a removal passageway leading from said collection area, whereby volatile fluids are collected from the air and surface around a dry cleaning machine.

16. A process for confining volatile liquids adjacent a dry cleaning machine in accordance with claim 15 including the step of feeding forced air into the earth below said dry cleaning machine to thereby confine fluids escaping into the earth.

17. A process for confining volatile liquids adjacent a dry cleaning machine in accordance with claim 16 including the step of collecting the forced air and volatile fluids from the earth below said dry cleaning machine to thereby clean the earth below the dry cleaning machine.

18. A process for confining volatile liquids adjacent a dry cleaning machine in accordance with claim 19 including the step of mounting a framework of pipes around a dry cleaning machine for feeding and collecting the air and volatile fluids, said framework of pipes being positioned to created a curtain of air around said dry cleaning machine.

19. A chemical control system for confining volatile liquids comprising:

a first set of interconnected pipes positioned adjacent an area for handling volatile fluids, a plurality of said pipes having a plurality of openings therein positioned in predetermined positions in said pipes;

an air inlet pipe connected to said first set of interconnected pipes;

a source of pressurized air connected to said air inlet pipe for feeding air into said first set of interconnected pipes and out said openings therein whereby air is fed in a predetermined pattern;

a second set of interconnected pipes positioned adjacent an area for handling volatile fluids, a plurality of said pipes having a plurality of inlet openings therein for receiving fluid thereinto;

an outlet pipe connected to said second set of interconnected pipes;

a source for placing a negative pressure on said outlet pipe for drawing fluid into said second set of interconnected pipes;

a filter system connected to said outlet pipe for filtering volatile fluids from the fluids being drawn into said second set of interconnected pipes; and a plurality of pipes extending into the earth below said second set of interconnected pipes, each pipe having a plurality of openings therein for feeding forced air into the surrounding earth to thereby confine fluid seeping thereunto.

20. A chemical control system for confining volatile liquids in accordance with claim 19 in which a fluid collecting pipe has a plurality of opening therein to collect fluids seeping from the earth for removing air forced into the earth by said plurality of pipes extending into the earth and captured fluids to there by clean the earth therearound.

* * * * *